(12) United States Patent
Kufner et al.

(10) Patent No.: US 10,480,341 B2
(45) Date of Patent: Nov. 19, 2019

(54) RUN-IN COATING FOR AN OUTER AIR SEAL OF A TURBOMACHINE

(71) Applicant: MTU Aero Engines AG, Munich (DE)

(72) Inventors: Petra Kufner, Poing (DE); Walter Gieg, Eichenau (DE); Rudolf Stanka, Rattenkirchen (DE); René Schneider, Ottobrunn (DE); Norman Cleesattel, Zorneding (DE); Joachim Lorenz, Altomuenster (DE)

(73) Assignee: MTU AERO ENGINES AG, Munich (DE)

( * ) Notice: Subject to any disclaimer, the term of this patent is extended or adjusted under 35 U.S.C. 154(b) by 387 days.

(21) Appl. No.: 15/364,601

(22) Filed: Nov. 30, 2016

(65) Prior Publication Data
US 2017/0159482 A1    Jun. 8, 2017

(30) Foreign Application Priority Data
Dec. 3, 2015   (DE) .................. 10 2015 224 160

(51) Int. Cl.
*F01D 11/12*    (2006.01)
*F01D 5/02*    (2006.01)
*F01D 25/00*    (2006.01)

(52) U.S. Cl.
CPC .............. *F01D 11/127* (2013.01); *F01D 5/02* (2013.01); *F01D 25/005* (2013.01); *F05D 2220/323* (2013.01); *F05D 2230/10* (2013.01); *F05D 2230/90* (2013.01); *F05D 2240/11* (2013.01); *F05D 2250/283* (2013.01); *Y02T 50/671* (2013.01)

(58) Field of Classification Search
CPC .......... F01D 11/127; F01D 11/12; F01D 5/02; F01D 5/005; F05D 2250/283; F02D 25/005
See application file for complete search history.

(56) References Cited

U.S. PATENT DOCUMENTS

| | | | |
|---|---|---|---|
| 6,537,020 B2 | 3/2003 | Humhauser | |
| 6,610,416 B2 | 8/2003 | Wallace et al. | |
| 8,641,371 B2 | 2/2014 | Nakamura et al. | |
| 8,939,707 B1 * | 1/2015 | Lee | F01D 11/122 415/1 |
| 2001/0048876 A1 | 12/2001 | Humhauser | |
| 2002/0158417 A1 | 10/2002 | Wallace et al. | |
| 2009/0148278 A1 | 6/2009 | Allen | |
| 2009/0297331 A1 | 12/2009 | Caucheteux et al. | |

(Continued)

FOREIGN PATENT DOCUMENTS

| | | |
|---|---|---|
| DE | 10020673 A1 | 10/2001 |
| DE | 60219235 T2 | 5/2008 |
| DE | 102013201761 A1 | 8/2014 |

*Primary Examiner* — Jacob M Amick
(74) *Attorney, Agent, or Firm* — Abel Schillinger, LLP

(57) ABSTRACT

The invention relates to a run-in coating (10) for an outer air seal of a turbomachine, especially of an aero engine, comprising a substrate (12) of segmented form which carries a honeycomb structure (14) with an run-in surface (15) to face rotor blades of a rotor of the turbomachine, wherein a radial thickness of the honeycomb structure (14) varies in the circumferential direction. The invention furthermore relates to an outer air seal for a turbomachine and also to a turbomachine with an outer air seal.

19 Claims, 1 Drawing Sheet

(56) References Cited

U.S. PATENT DOCUMENTS

| | | |
|---|---|---|
| 2010/0247298 A1 | 9/2010 | Nakamura et al. |
| 2014/0227087 A1 | 8/2014 | Lutjen et al. |
| 2014/0271142 A1 | 9/2014 | Albers et al. |
| 2015/0016969 A1* | 1/2015 | Gieg .................... F01D 25/183 |
| | | 415/173.1 |

* cited by examiner

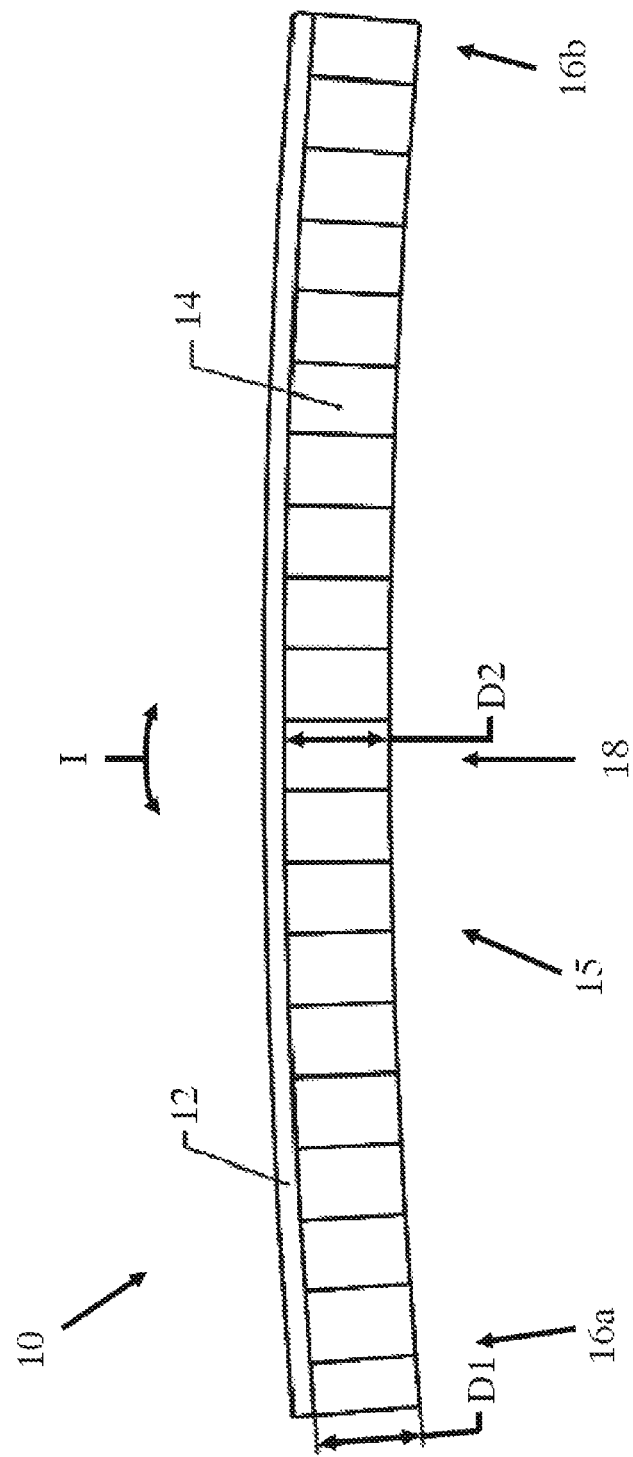

RUN-IN COATING FOR AN OUTER AIR SEAL OF A TURBOMACHINE

BACKGROUND OF THE INVENTION

Field of the Invention

The invention relates to a run-in coating for an outer air seal of a turbomachine. The invention furthermore relates to a method for producing such a run-in coating, to an outer air seal for a turbomachine and also to a turbomachine having such an outer air seal.

Discussion of Background Information

In turbomachines, such as thermal gas turbines or aero engines, a rotor, having a multiplicity of rotor blades, rotates in relation to a stator which is formed by the surrounding casing. In order to achieve a high level of efficiency, the entire working gas of the turbomachine is as far as possible to flow through the provided flow path and impinge upon the rotor blades. The ability of working gas to flow past between the free ends of the rotor blades and the opposite casing is correspondingly to be avoided since this leads to a reduction of the efficiency of the turbomachine. To this end, the so-called outer air seal (OAS) is arranged on the outer casing so that under all operating conditions a leakage flow of working gas which is as small as possible occurs in the region of the free ends of the rotor blades. The outer air seal in this case comprises a plurality of run-in coatings which are arranged in a ring-like manner and in each case have a substrate of segmented form which carries a honeycomb structure with a run-in surface to face the rotor blades of the rotor. The substrate could therefore also be referred to as a honeycomb carrier. As a rule, this is formed from a metallic material. During operation of the turbomachine, the run-in coating provides the run-in surface or sealing face for the rotor blade tips. For this, the rotor blade tips are customarily armor-plated or provided with sealing fins and in the event of contact wear away material in the region of the run-in surface of the honeycomb structure.

Since, however, the OAS is designed in the form of interconnected segments it bows under thermal load during operation, as a result of which uneven rubbing in by the rotor blade tips occurs along the circumference. Consequently, the sealing gap is also unevenly enlarged which in turn leads to greater leakages and worsening of the efficiency of the turbomachine.

In general, it may be noted that the terms "axial-" or "axial", "radial-" or "radial" and "circumferential-" always refer to the machine axis or rotational axis of the turbomachine provided something different is not implicitly implied or explicitly implied by the context.

It is the object of the present invention to create a run-in coating of the type referred to in the introduction which ensures a reduced sealing gap during operation of an associated turbomachine. Further objects of the invention consist in providing a method for producing such a run-in coating and also an outer air seal and a turbomachine having at least one such run-in coating.

SUMMARY OF THE INVENTION

A first aspect of the invention relates to a run-in coating for an outer air seal of a turbomachine, especially of an aero engine. According to the invention, a reduced sealing gap during operation of an associated turbomachine is ensured by a radial thickness of the honeycomb structure (14) being varied in the circumferential direction. In other words, the run-in coating is of contoured design in the circumferential direction and has at least one region with a comparatively larger thickness or at least one region with a comparatively smaller thickness. As a result of this, the run-in coating can be provided with radial- or thickness variations, which are optimized to the respective application purpose, in order to compensate bowing of the run-in coating which occurs during operation. En the case of an aero engine, the run-in coating can for example be optimized for a cruising-flight operating state so that a cutting of the rotor blades into the honeycomb structure, which is more even or smaller over the circumference, is achieved, which in turn ensures a reduced radial or sealing gap and a correspondingly higher level of efficiency of an associated turbomachine.

In an advantageous embodiment of the invention, it is provided that the substrate is of circular segmented form and/or has a radial thickness in the circumferential direction which at least in the main is constant. In other words, the substrate, which carries the honeycomb structure, is not of contoured form but is of circular segmented form or has a constant thickness in the circumferential direction. As a result of this, a simple and reliable connection of the honeycomb structure to the substrate is ensured on the one hand and on the other hand a simple and reliable connection of the substrate to a customarily circular inner wall of a casing of an associated turbomachine is ensured.

Both the radially outer surface of the honeycomb structure, which adjoins the substrate and is connected to this, and the radially inner surface of the honeycomb structure, i.e. the run-in surface, can preferably be of arc-like design orthogonally to the machine axis or rotational axis of the turbomachine in a sectional plane, wherein, however, the middle points of the two arcs do not coincide. The middle point of the arc which defines the radially outer surface of the honeycomb structure can especially be at a greater distance from the run-in coating than the middle point of the arc which defines the run-in surface. The middle point of the arc which defines the radially outer surface of the honeycomb structure preferably lies on the machine axis or rotational axis of the turbomachine in the cold and installed state of the run-in coating, whereas the middle of the arc which defines the run-in surface lies between the machine axis or rotational axis of the turbomachine and run-in coating in the radial direction. If, therefore, a multiplicity of run-in coatings according to the invention are installed in a ring-like manner around the machine axis or rotational axis of the turbomachine then in the cold state of the turbomachine all the radially outer surfaces of the honeycomb structure preferably lie on a common cylindrical or conical surface, the middle point of which is defined by the machine axis, whereas this does not apply to the radially inner surfaces of the honeycomb structure. In this way, the individual run-in coatings can form a closed ring radially on the outside. If the installed run-in coatings heat up, however, while the turbomachine is running up, then upon reaching a predetermined temperature all the radially inner surfaces of the honeycomb structure preferably lie on a common cylindrical or conical surface, the middle point of which is defined by the machine axis, whereas this does not have to apply to the radially outer surfaces of the honeycomb structure, at least not necessarily so.

By the honeycomb structure having different local thicknesses in the circumferential direction, an especially simple and precise contouring of the run-in surface can be achieved.

It can be provided in this case that the run-in coating is designed in such a way that in an intended installed position of the run-in coating in the turbomachine a radial distance of the run-in surface to a machine axis of the turbomachine does not alter in an axial direction. In other words, an optional start point on the run-in surface of the run-in coating can be selected, wherein starting from this start point, progressing in, or opposite, the axial direction, the distance from the run-in surface to the machine axis or rotational axis of the turbomachine does not alter. In this case, a brand-new state of the run-in coating is naturally to be taken into account, i.e. a state in which sealing fins of a rotor blade row of the turbomachine lying opposite the run-in surface have not yet left behind rubbing recesses in the run-in surface.

Alternatively, it can also be advantageous, however, if the run-in coating is designed in such a way that in an intended installed position of the run-in coating in the turbomachine a radial distance of the run-in surface to a machine axis of the turbomachine alters in the axial direction. This can preferably be the case in a stepped manner so that the run-in coating has a radial step. In this case, the regions which are axially in front of and axially behind the radial step are preferably designed in each case so that the radial distance of the run-in surface to the machine axis does not alter in the axial direction. For example, the axially front region can lie radially opposite a first sealing-fin row of the rotor blade, whereas the axially rear region can lie radially opposite a second sealing-fin row of the rotor blade.

In a further advantageous embodiment of the invention it is provided that the run-in coating in the circumferential direction has a middle region which is arranged between a first end region and a second end region, wherein the first end region and the second end region have a larger radial thickness than the middle region. In other words, the radial thickness of the run-in coating in the circumferential direction at the segment end is thicker than in the middle. This allows a particularly good compensation of the bowing of the run-in coating during operation of an associated turbomachine. The smallest thickness of the run-in coating is preferably exactly in the middle with regard to the circumferential direction.

Further advantages result if the radial thickness of the run-in coating in the middle region is at most 99.5% of the radial thickness of the run-in coating in the first and/or in the second end region. For example, thicknesses of 99.5%, 99.4%, 99.3%, 99.2%, 99.1%, 99.0%, 98.9%, 98.8%, 98.7%, 98.6%, 98.5%, 98.4%, 98.3%, 98.2%, 98.1%, 98.0%, 97.9%, 97.8%, 97.7%, 97.6%, 97.5%, 97.4%, 97.3%, 97.2%, 97.1%, 97.0%, 96.9%, 96.8%, 96.7%, 96.6%, 96.5%, 96.4%, 96.3%, 96.2%, 96.1%, 96.0%, 95.9%, 95.8%, 95.7%, 95.6%, 95.5%, 95.4%, 95.3%, 95.2%, 95.1%, 95.0% or less, and corresponding intermediate values such as 98.60%, 98.59%, 98.58%, 98.57%, 98.56%, 98.55%, 98.54%, 98.53%, 98.52%, 98.51% etc., are to be understood by a thickness of at most 99.5%. For example, the radial thickness of the run-in coating or of the honeycomb structure in one end region or in both end regions is about 0.204 cm, whereas the thickness in the middle region or in the middle is about 0.201 cm, that is to say about 98.52% of the end-region thickness or thicknesses.

Particularly good sealing properties ensue if the radial thickness of the run-in coating decreases monotonically, especially strictly monotonically, from the first end region to the middle region and/or from the second end region to the middle region in the circumferential direction.

A second aspect of the invention relates to a method for producing a run-in coating according to the first inventive aspect, wherein a reduced sealing gap is ensured during operation of an associated turbomachine by a run-in coating being provided with a substrate, which carries a honeycomb structure with a run-in surface of circular segmented form to face rotor blades of a rotor of the turbomachine, and being contoured in the circumferential direction so that a radial thickness of the honeycomb structure varies in the circumferential direction. In other words, in contrast to the prior art it is provided that a run-in coating of circular segmented form is first of all provided with a thickness in the circumferential direction which at least in the main is constant, and is then contoured in such a way that it has at least one region with a comparatively larger thickness and at least one region with a comparatively smaller thickness. As a result of this, the run-in coating can be provided with radial or thickness characteristics which are optimized to the respective application purpose in order to compensate bowing of the run-in coating which arises during operation. For example, the run-in coating in the case of an aero engine can be optimized for a cruising-flight operating state so that a more even and smaller cutting of the rotor blades into the honeycomb structure over the circumference is achieved, which in turn ensures a reduced sealing gap and a correspondingly higher level of efficiency of an associated turbomachine. Further features and their advantages are to be gathered from the descriptions of the first inventive aspect, wherein advantageous embodiments of the first inventive aspect are to be considered as being advantageous embodiments of the second inventive aspect and vice versa.

In an advantageous embodiment of the invention, the honeycomb structure is subjected to a separation process for the contouring, at least in areas. As a result of this, regions with smaller thickness can be produced particularly quickly, simply and precisely. As the separation process, especially a cutting separation process, such as grinding, can be used. However, one or more other separation processes can basically also be used.

A third aspect of the invention relates to an outer air seal for a turbomachine, which comprises a plurality of run-in coatings arranged in a ring-like manner. A reduced sealing gap during operation of an associated turbomachine is ensured in this case according to the invention by at least one of the run-in coatings being designed according to the first inventive aspect and/or being produced according to the second inventive aspect. By one, a plurality, or all the run-in coatings of the outer air seal being designed according to the invention, bowing of the individual run-in coatings during operation of an associated turbomachine can be optimally compensated. Further ensuing features and their advantages are to be gathered from the descriptions of the first and of the second inventive aspects, wherein advantageous embodiments of the first and second inventive aspects are considered as being advantageous embodiments of the third inventive aspect and vice versa.

A fourth aspect of the invention relates to a turbomachine, especially to an aero engine, which has a casing and a rotor which is arranged in the casing and can rotate around a rotational axis, wherein an outer air seal, which comprises a plurality of run-in coatings arranged in a ring-like manner, is arranged between the casing and rotor blades of the rotor. A reduced sealing gap during operation of the turbomachine is ensured in this case according to the invention by at least one of the run-in coatings being designed according to the first inventive aspect and/or being produced according to the second inventive aspect and/or by the outer air seal being designed according to the third inventive aspect. The features ensuing therefrom and their advantages are to be gathered from the descriptions of the first, second and third inventive aspects, wherein advantageous embodiments of the first, second and third inventive aspects are to be considered as being advantageous embodiments of the fourth inventive aspect and vice versa.

Further features of the invention ensue from the claims and from the exemplary embodiments. The features and feature combinations which are referred to above in the description, and also the features and feature combinations which are subsequently referred to in the exemplary embodiments and/or expressed on their own are not only applicable in the respectively disclosed combination but are also applicable in other combinations without departing from the scope of the invention. There are therefore also embodiments which are to be considered as being embraced and disclosed by the invention and which are not explicitly expressed and explained in the exemplary embodiments, but by separated feature combinations are developed and producible from the explained embodiments. There are also embodiments and feature combinations which are to be considered as being disclosed and which therefore do not have all the features of an originally formulated independent claim. In this case, the single FIGURE shows a run-in coating according to the invention in a schematic view from the front, i.e. in a view along the machine axis, which is not shown, of the turbomachine.

BRIEF DESCRIPTION OF THE DRAWING

The attached FIGURE shows a run-in coating according to the present invention in a schematic view from the front.

DETAILED DESCRIPTION OF EMBODIMENT OF THE INVENTION

The single FIGURE shows a run-in coating 10 according to the invention for an outer air seal (OAS) in a schematic view from the front. The run-in coating 10 comprises a substrate 12 of circular segmented form which carries a honeycomb structure 14 with a run-in surface 15 which serves for reducing and for minimizing a radial gap in relation to rotor blades of a rotor and for better sealing of a casing of an aero engine in relation to the rotor blades which rotate with the rotor around a rotational axis. In turbomachines, such as aero engines, the efficiency and the operating behavior are dependent to a high degree on whether the radial or sealing gap between the rotor blades and the casing can be kept as small as possible in order to prevent leakages. The run-in coatings of the OAS segments known from the prior art are therefore produced with a thickness which is constant in the circumferential direction, as a result of which they have in each case a run-in surface of circular segmented form. As a result, however, different rubbing depths of the rotor blades in the circumferential direction are created during operation since the run-in coatings bow under thermal load during operation, as a result of which correspondingly uneven radial gaps with comparatively high leakages are formed.

In order to avoid this, the run-in coating 10 according to the invention has a contoured cross-sectional thickness in the circumferential direction (double arrow I) of the OAS. It is evident that the honeycomb structure 14 in the side end regions 16a, 16b of the run-in coating 10 is thicker than in the middle region 18, as a result of which a run-in surface 15 which is inwardly bowed in relation to the substrate 12 is created. The thickness D1 of the honeycomb structure 14 at the respective segment ends 16a, 16b is about 0.204 cm by way of example in the featured exemplary embodiment, whereas the thickness of the honeycomb structure 14 in the middle 18 of the run-in coating 10 is about 0.201 cm by way of example. Between the respective end regions 16a, 16b and the middle region 18 the thickness of the honeycomb structure 14 decreases constantly, as a result of which a stepless contour characteristic is created. In this case, both the radially outer surface of the honeycomb structure 14, which adjoins the substrate 12 and is connected to this, and also the radially inner surface of the honeycomb structure 15, i.e. the run-in surface 15, can preferably be designed in the form of an arc orthogonally to the aero-engine axis or machine axis in the sectional view represented in the FIGURE, wherein, however, the middle points of the two arcs do not coincide. The middle point of the arc which defines the radially outer surface of the honeycomb structure can especially be at a greater distance from the run-in coating 10 than the middle point of the arc which defines the run-in surface 15. Furthermore, the middle point of the arc which defines the radially outer surface of the honeycomb structure can preferably lie on the aero-engine axis or machine axis.

Compared with this, the substrate 12 has a uniform or continuously constant thickness or is designed in a circular segmented form. As a result of this optimized thickness characteristic of the honeycomb structure 14, and therefore of the run-in coating 10, bowing of the run-in coating 10 is particularly well compensated during operation. For producing this contouring, for example a conventional run-in coating with constant thickness or with a run-in surface of circular segmented form can first of all be produced and correspondingly ground back in areas in order to produce the desired contouring.

LIST OF REFERENCE NUMERALS

10 Run-in coating
12 Substrate
14 Honeycomb structure
16a End region
16b End region
18 Middle region
I Circumferential direction
D1 First radial thickness
D2 Second radial thickness

What is claimed is:

1. A run-in coating for an outer air seal of a turbomachine, wherein the run-in coating comprises a substrate of segmented form which carries a honeycomb structure with a run-in surface to face rotor blades of a rotor of the turbomachine, and wherein a radial thickness of the honeycomb structure varies in circumferential direction.

2. The run-in coating of claim 1, wherein the substrate is of circular segmented form.

3. The run-in coating of claim 1, wherein the substrate has a radial thickness in circumferential direction which is at least substantially constant.

4. The run-in coating of claim 2, wherein the substrate has a radial thickness in circumferential direction which is at least substantially constant.

5. The run-in coating of claim 1, wherein the run-in coating is designed in such a way that in an intended installed position of the run-in coating in the turbomachine a radial distance of the run-in surface to a machine axis of the turbomachine does not change in axial direction.

6. The run-in coating of claim 1, wherein the run-in coating is designed in such a way that in an intended installed position of the run-in coating in the turbomachine a run-in surface of the run-in coating has a radial step.

7. The run-in coating of claim 1, wherein the run-in coating comprises a middle region which is arranged between a first end region and a second end region as seen in circumferential direction, the first and the second end regions having a larger radial thickness than the middle region.

8. The run-in coating of claim 7, wherein the radial thickness of the run-in coating in the middle region is at most 99.5% of the radial thickness of the run-in coating in the first and/or second end regions.

9. The run-in coating of claim 7, wherein the radial thickness of the run-in coating decreases monotonically from the first end region to the middle region and/or from the second end region to the middle region in circumferential direction.

10. The run-in coating of claim 8, wherein the radial thickness of the run-in coating decreases monotonically from the first end region to the middle region and/or from the second end region to the middle region in circumferential direction.

11. The run-in coating of claim 7, wherein the radial thickness of the run-in coating decreases strictly monotonically from the first end region to the middle region and/or from the second end region to the middle region in circumferential direction.

12. A method for producing the run-in coating of claim 1, wherein the method comprises providing a run-in coating with a substrate which carries a honeycomb structure with a run-in surface of circular segmented form to face rotor blades of a rotor of the turbomachine, and is contoured in circumferential direction so that a radial thickness of the honeycomb structure varies in the circumferential direction.

13. The method of claim 12, wherein for contouring, the honeycomb structure is subjected to a separation process at least in areas.

14. The method of claim 12, wherein the separation process comprises grinding.

15. An outer air seal for a turbomachine, wherein the seal comprises a plurality of run-in coatings arranged in a ring-like manner, at least one of the plurality of run-in coatings being a run-in coating according to claim 1.

16. A turbomachine, wherein the turbomachine comprises the outer air seal of claim 15.

17. A turbomachine, wherein the turbomachine comprises a casing and a rotor which is arranged in the casing and can rotate around a rotational axis, and wherein an outer air seal which comprises a plurality of run-in coatings arranged in a ring-like manner, is arranged between the casing and rotor blades of the rotor, at least one of the plurality of run-in coatings being a run-in coating according to claim 1.

18. The turbomachine of claim 16, wherein the turbomachine is an aero engine.

19. The turbomachine of claim 17, wherein the turbomachine is an aero engine.

\* \* \* \* \*